July 10, 1956  H. BRIER  2,754,465
ELECTRIC MOTOR CONTROL FOR POWER STEERING
Filed June 7, 1952   3 Sheets-Sheet 2

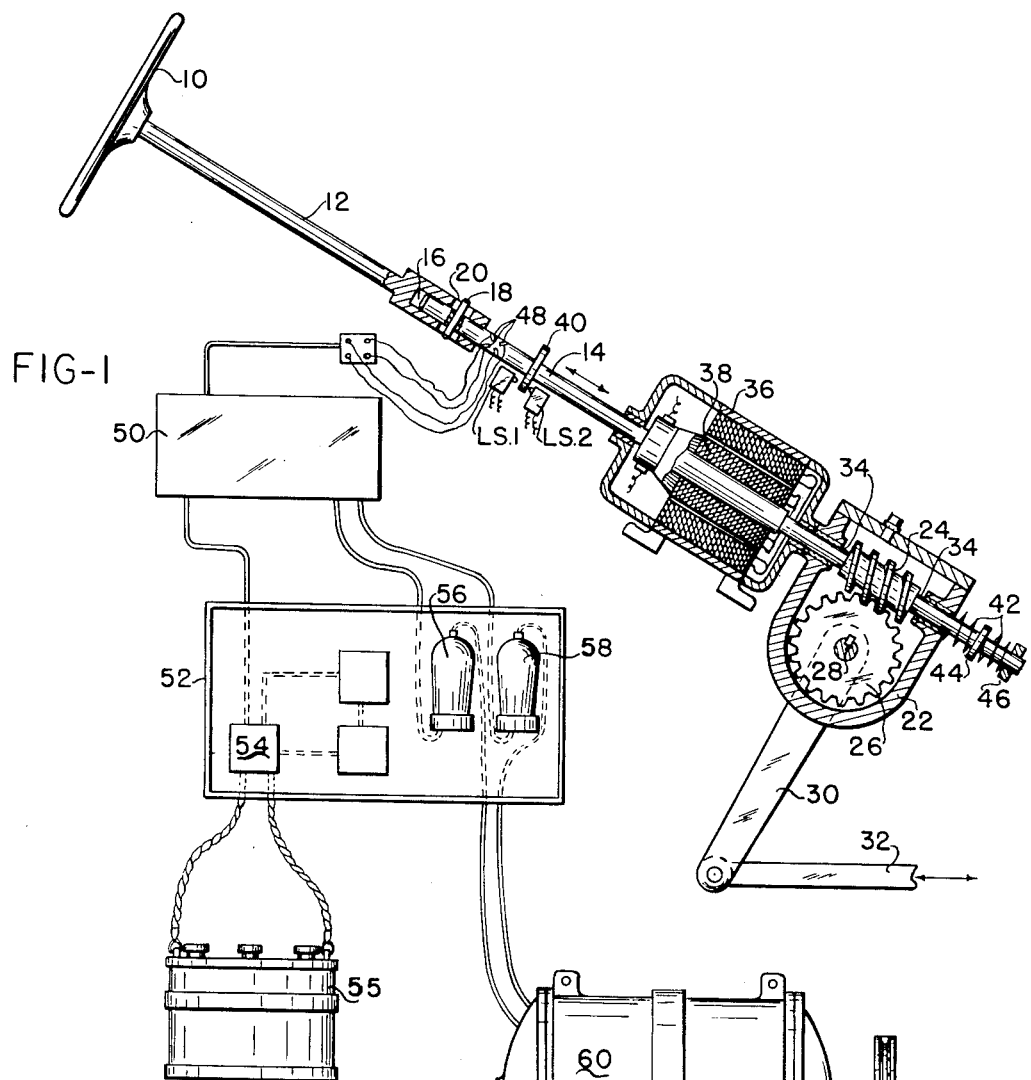

INVENTOR
HYMAN BRIER
BY Toulmin & Toulmin
ATTORNEYS

July 10, 1956  H. BRIER  2,754,465
ELECTRIC MOTOR CONTROL FOR POWER STEERING
Filed June 7, 1952  3 Sheets-Sheet 3
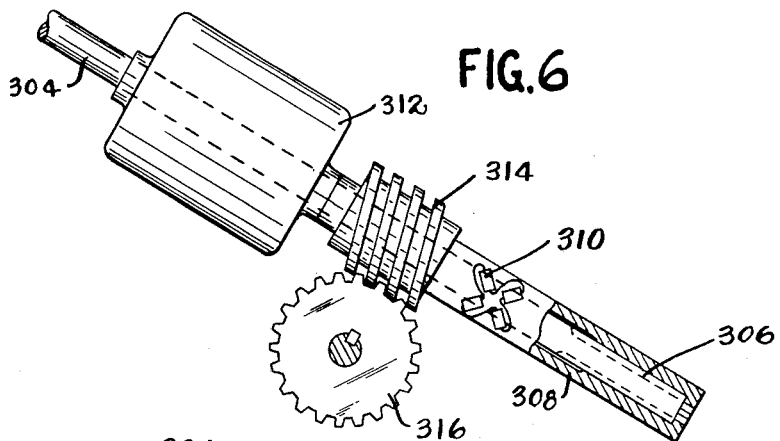
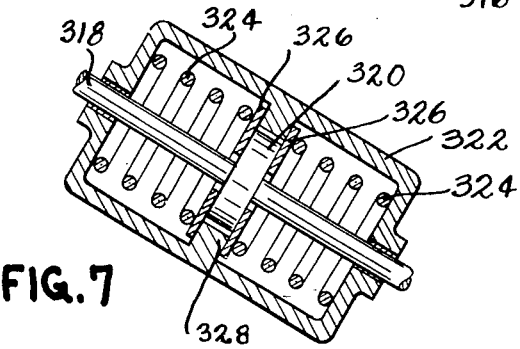
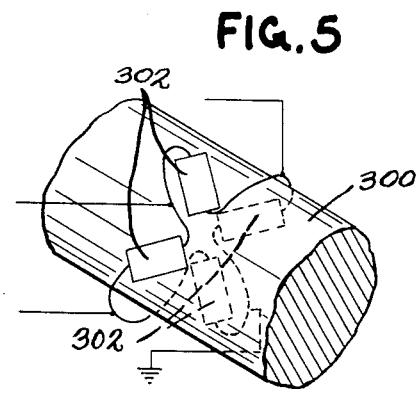
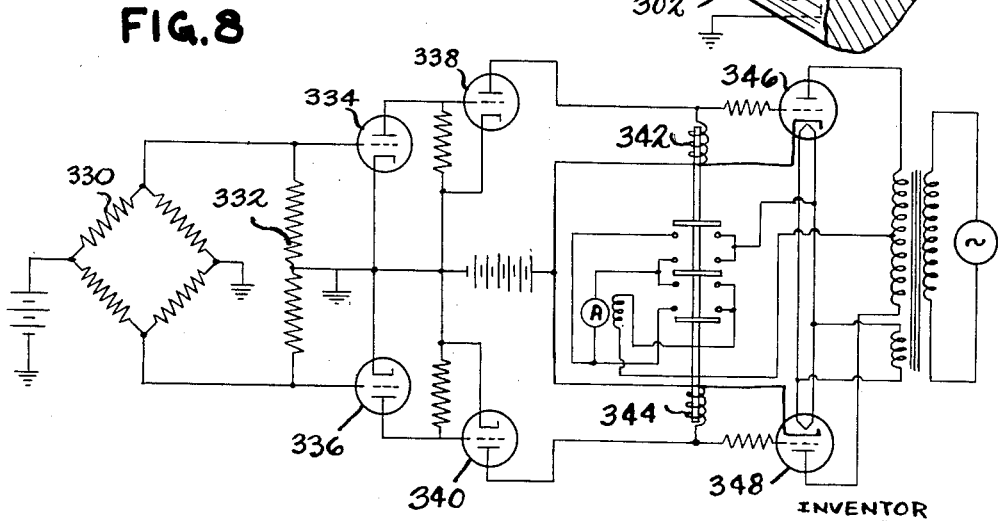
INVENTOR
HYMAN BRIER
by
Toulmin & Toulmin
ATTORNEYS United States Patent Office 2,754,465
Patented July 10, 1956

2,754,465

ELECTRIC MOTOR CONTROL FOR POWER STEERING

Hyman Brier, Dayton, Ohio, assignor to The Commonwealth Engineering Company of Ohio, Dayton, Ohio, a corporation of Ohio Application June 7, 1952, Serial No. 292,361

8 Claims. (Cl. 318—488)

This invention relates to power steering arrangements, and particularly to a power steering arrangement utilizing mechanical stress sensitive resistor elements, known as strain gages for detecting the direction and degree of force that is required for effecting the steering.

Power steering arrangements are well-known in the art, but heretofore have taken the form of hydraulic devices in which the detector consisted of a servovalve, with a hydraulic motor being employed for exerting the force desired on the steering mechanism. While these arrangements are, in general, satisfactory, there is need in the trade for a power steering device which will not require a fluid medium and which will, therefore, not be subject to varying characteristics in extremely cold weather or extremely hot weather, and subject to failure due to fluid leakage and failure of hydraulic components.

Having the foregoing in mind, a primary object of the present invention is the provision of a power steering arrangement for vehicles and the like which operates entirely in the absence of any hydraulic components or hydraulic mediums.

A further object of the present invention is the provision of a power steering arrangement which is rapid in operation and which will not tend to hunt about its rest position.

A particular object of this invention is the provision of a power steering arrangement of the nature referred to which is entirely electrical in operation.

Another object is the provision of a power steering arrangement in which substantially no power is consumed except when the arrangement is in actual operation.

These and other objects and advantages will become more apparent upon reference to the following specification taken in connection with the accompanying drawings, in which:

Figure 1 is a more or less diagrammatic view showing the essential parts of a vehicle steering arrangement and including the power steering device of the present invention.

Figure 2 is a fragmentary view drawn at a larger scale than Figure 1 and showing the arrangement on the steering column of a plurality of strain gage detectors forming a part of the control circuit of this invention.

Figure 5 is a perspective view showing an arrangement of the bridge on the shaft arranged so as to compensate for bending of the shaft under its own weight;

Figure 6 is a view showing a modified arrangement where the manually rotatable shaft telescopes with the power driven shaft;

Figure 7 is a sectional view showing a preferred arrangement of the centering springs for the rotatable shaft; and Figure 8 is a view similar to Figure 3 but illustrating an arrangement wherein both the direction and amplitude of the power release to the motor is controlled by the strain gauges.

Figure 3:
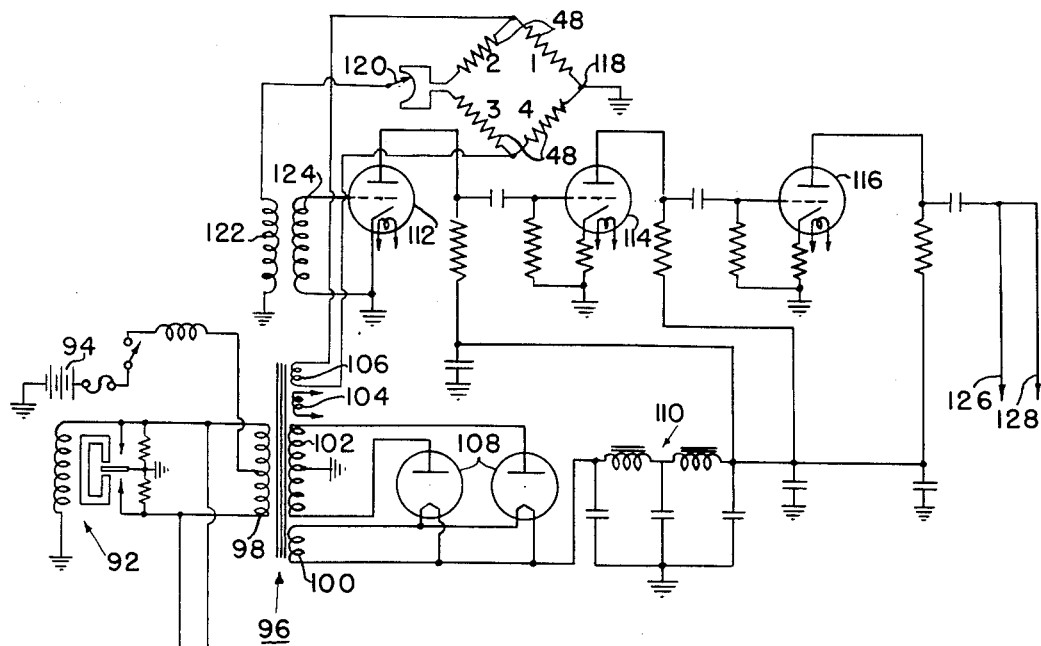
Figure 3 is a diagrammatic representation of the power circuit of this invention by means of which the power steering is accomplished.

Referring to the drawings somewhat more in detail, Figure 1 illustrates a steering arrangement wherein a steering wheel 10 is connected with a steering column having a part 12 that telescopically engages another part 14, as at 16. A pin 18 drivingly connects parts 12 and 14 for rotation in unison, while a slot 20 that receives the pin permits axial movement of part 14.

Part 14 at its extreme right-hand or lower end is journaled in a gear box 22, and within the gear box has mounted thereon a worm 24 engaging a worm wheel or worm sector 26 keyed to a shaft 28 that drives an arm 30 connected by a drag link 32 with the steerable wheels of the vehicle. It will be understood that link 32 could be connected with a rudder if the system were employed for water craft, or could be connected to the rudder and ailerons of an aircraft, if employed in connection therewith.

Worm 24 is fixed on part 14 of the steering column, and a clearance between the opposite ends of the worm and the housing 22 is provided at 34. The provision of clearance 34 permits reciprocatory movement of part 14 whenever rotation thereof, together with worm 24, encounters resistance in the form of loading on drag link 32.

Mounted adjacent housing 22 and surrounding part 14 is frame 36 of a direct-current motor having an armature 38 fixed on part 14.

Also mounted on part 14 is a switch actuating element 40 adapted for engaging and closing a limit switch LS1 when part 14 moves upwardly, as viewed in Figure 1, and for engaging and closing a switch LS2 when the said part 14 moves downwardly.

Normally, part 14 is supported so that switch actuating element 40 is midway between switches LS1 and LS2, and this may readily be accomplished by the centering springs 42 that bear between casing 22 and a collar 44 fixed on part 14, and between part 44 and a stationary abutment 46.

For detecting the degree of the torque exerted on part 14 to initiate steering operations, the said part has mounted thereon a plurality of mechanical stress sensitive resistor elements 48 known as strain gages, connected in a bridge circuit, as will best be seen in Figure 2. These strain gages may be of any suitable nature, but the bonded type of gage is to be preferred because of the ease with which it can be attached to part 14 and the general ruggedness of this type of element.

The strain gages are mounted at angles of approximately 45° to the direction of the axis of part 14, as will be seen in Figure 2, and because of this arrangement, when the part 14 is subjected to torque in one direction, two opposite of the strain gages will be shortened, while the other two opposite ones thereof will be lengthened, thereby unbalancing the bridge in one direction.

When the part 14 is subjected to torque in the opposite direction, the opposite conditions obtain for the strain gages and the bridge is unbalanced in the opposite direction.

The limit switches LS1 and LS2, therefore, serve to detect the direction of the stress on part 14, while the strain gage bridge referred to detects the degree of the stress.

The strain gages are connected through an amplifier 50 with a power unit 52, which includes a vibrator 54 supplied from a battery 55, and the two grid-controlled gas discharge tubes 56 and 58 which are connected to form a full-wave rectifier supplied by alternator 60 driven by belt 62 that passes over a pulley driven by the engine of the vehicle.

The grid-controlled gas discharge tubes 56 and 58 have their plate circuits connected in circuit with steering motor 36, 38, and the limit switches LS1 and LS2, for supplying power to the motor in the proper degree and in the proper direction.

Turning now to Figure 3, it will be seen that alternator 60 discharges through primary coil 64 of a transformer having a center tapped secondary 66 having its ends connected with the plates of the tubes 56 and 58 and having its center tap connected by wire 68 through the field coil of motor 36, 38 with the terminals 70 and 72 of a double-acting relay R.

Relay R also includes terminals 74 and 76 connected by a wire 78 with the cathodes of tubes 56 and 58.

Relay R includes contacts 80 and 82 that are connected with one side of armature 38 of the steering motor and contacts 84 and 86 that are connected with the other side of the armature.

A solenoid S1 associated with relay R is energizable for shifting the armature of the relay so that contacts 76 and 84 are interconnected and contacts 72 and 82 are interconnected. A second solenoid S2 of the relay is energizable so that it moves the armature to interconnect contacts 74 and 80, while interconnecting contacts 70 and 86. The described arrangement provides for opposite directions of rotation for armature 38 because the field coil of the motor is always supplied in the same direction.

Solenoid S1 is in circuit with limit switch LS1 and secondary 88 of a transformer that also comprises a primary coil 90. Similarly, solenoid S2 is in circuit with secondary 88 of the transformer and limit switch LS2.

Primary 90 of the transformer is connected for being supplied from the vibrator 92 that receives its supply from a battery 94.

A transformer 96 associated with the vibrator has a primary coil 98 and secondary coils 100, 102, 104 and 106. Secondary 100 supplies filament or heater voltage for tubes 108 of a full wave rectifier with the plates of the said tubes connected to the opposite ends of secondary 102, and it has a ground center tap.

A filter 110 is provided that supplies plate voltage to the amplifier tubes 112, 114, and 116. Filament or heater voltage is supplied to these tubes from secondary 104 of transformer 96.

The strain gage bridge previously referred to has one corner terminal grounded at 118, and its other corner terminal connected through a rheostat 120 and a coil 122 with ground. The other terminals of the bridge are connected to be supplied by secondary 106 of transformer 96.

Coil 122 is coupled with coil 124 for biasing the grid of tube 112. Tube 112 is, in turn, resistance coupled with tube 114 and tube 114 is resistance coupled with tube 116. The signal from tube 116 is carried by the wires 126 and 128 to the grids of tubes 56 and 58, thereby to control the amount of discharge therefrom.

It will be understood that the specific circuit for detecting the signal from the strain gage bridge and amplifying it to the desired degree for triggering the tubes 56 and 58 could be varied within wide limits according to practices well-known in the art, and that, accordingly, the present invention is not limited to the specific arrangement illustrated in Figure 3, but intends broadly to include any suitable detecting and amplifying means that could be interposed between the strain gage bridge and tubes 56 and 58.

In Figure 3 the bridge is supplied with alternating current from the vibrator, and the amount of unbalance of the bridge is conveyed to the grid of tube 112 through a transformer, so that either direction of unbalance of the bridge will produce the same signal from tube 112.

Figure 4:
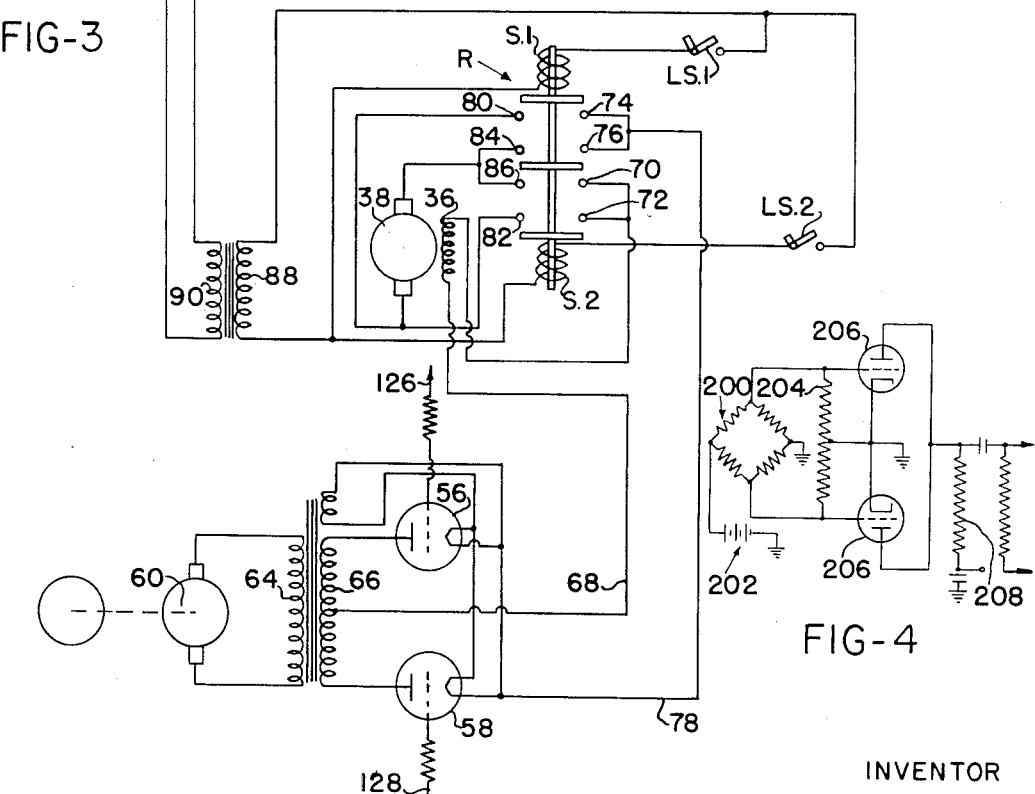
Figure 4 is a fragmentary view showing a modified arrangement for converting the signal from the strain gage bridge into a signal that will drive the amplifiers that control the application of power in the steering system.

In Figure 4, I show an arrangement whereby the strain gage bridge, indicated at 200, can be supplied by direct current from a battery 202, and the opposite corners of the bridge where the unbalance is to be detected are to be connected by resistance 204. The ends of this resistance are connected with the grids of the detector tubes 206, the cathodes of which are connected together and to the center of resistance 204.

The plates of tubes 206 are interconnected with each other and with one end of a biasing resistor 208 which develops the signal for the next amplifying tube. The Figure 4 arrangement is such that for one direction of unbalance of bridge 200, one of the tubes 206 discharges, while for the opposite direction of unbalance of the bridge, the other of the tubes 206 discharges, but in either case the same signal is developed on resistor 208.

Still other modifications of the detecting and amplifying circuit will suggest themselves to those skilled in the art.

Inasmuch as alternator 60 supplies an alternating current, it is important for the vibrator 92 either to vibrate at a radically different frequency than is developed by the alternator, or to be so arranged as to remain in step therewith. This is necessary because the thyratrons 56 and 58 will conduct during that portion of the positive half cycle of the plate voltage that the grid voltage is positive. If, for example, the vibrator frequency is of the order of 10 times the alternator frequency it is at once seen that the positive half cycle of grid voltage is 1/10th the positive half cycle of the plate voltage. Under the most unfavorable circumstances the maximum negative half cycle of grid voltage would occur at the beginning of the positive half cycle of plate voltage. There would be no current through the thyratrons until the grid voltage became positive. Once the grid voltage becomes positive the thyratrons will begin to continue to fire throughout the remainder of the positive half cycle of plate voltage. Consequently, under unfavorable conditions the width of the pulse during which firing continues is 9/10 of the time duration of the positive half cycle. Therefore, it can be seen that the greater the difference between the vibrator and alternator frequencies the longer current will flow through the thyratrons and the motor 38 will be actuated during the flow of current. As a result, it is believed that the preferable of these arrangements is to select the vibrator with a much higher frequency than that of the alternator when the alternator is operating at its lower speeds, and this arrangement will provide for the maximum release of power from the alternator at lower speeds of operation thereof, with the possibility of reduced power supply at the higher speeds of operation thereof. In connection with a land vehicle, such as an automobile, an arrangement of this nature would be quite satisfactory because, as the speed of the vehicle increases, the resistance to the steering thereof decreases.

With air or water craft, the same situation would not generally arise because with such craft, the engine speed is more nearly constant than with the usual type land vehicle, and, therefore, the release of power from the alternator would be substantially uniform for all speeds of operation of the associated craft.

In any case, it will be evident that by operating the vibrator in phase with the alternator, or by selecting a predetermined difference in frequency therebetween, the release of power from the alternator could be made to vary in any desired degree or to remain constant.

In Figure 5 the rotatable shaft 300 has the strain gauges 302 arranged thereon with half the gauges on top of the shaft and the other half on the bottom, so that deflection of the shaft in its one plane does not have any effect on the strain gauge bridge. The bridge in Figure 5 is responsive only to turning efforts exerted on the shaft.

In Figure 6 the manually rotatable shaft is indicated at 304 and is splined at its lower end at 306 to a hollow shaft 308 on which hollow shaft the bridge 310 is mounted. Motor 312 is mounted about the hollow shaft and drives the said hollow shaft. The worm 314 is mounted on the hollow shaft between the motor and the strain gauge bridge and meshes with worm wheel 316.

In Figure 7 the shaft 318 to be held in a centered position under normal operating conditions is provided with a flange 320 located within a housing 332 in which are the springs 324. Washers 326 are disposed between the springs and collar 320 and also engage the internal flange 328 about the inside of the housing. The lower of springs 324 can be made slightly stiffer than the upper of the said springs, whereby the inclined shaft 318 will yield at the same thrust in both directions.

In Figure 8 the strain gauge bridge is indicated at 330 and across its opposite terminals is connected resistor 332 having a mid-tap leading to the cathodes of the detector tubes 334 and 336. These tubes have grids connected to the outer ends of resistor 332.

It is pointed out that the strain gage bridge, resistor, and detector tube portion of the circuit in Figure 8 is similar to and operates in the same manner as the circuit illustrated in Figure 4. Consequently, in the arrangement of Figure 8 either tube 346 or 348 will discharge depending on the direction of unbalance of the bridge 330. Each detector tube controls a corresponding amplifier tube 338, 340. These amplifier tubes are arranged so that their plates fit the solenoids 342 and 344, respectively, of a relay which is identical with relay R of Figure 3. This relay is made extremely sensitive, so that small plate currents from the amplifier tubes will cause it to operate, and in this manner the flow of current in the amplifier tubes through the relay coils can be employed for controlling the discharge from the rectifier tubes 346 and 348.

The Figure 8 arrangement, it will be appreciated, discloses a means for controlling not only the amount of power related to the driving motor for the steering arrangement, but also controls the direction of application of the power, whereby no limit switches are required for determining the direction of operation of the motor.

It will be understood that this invention is susceptible to modification in order to adapt it to different usages and conditions, and, accordingly, it is desired to comprehend such modifications within this invention as may fall within the scope of the appended claims.

I claim:

1. In combination; a rotatable shaft, means at one end of the shaft for exerting a torque thereon, means at the other end of the shaft for connecting it to a member to be driven, a reversible electric motor connected to said shaft, a source of electric power, mechanical stress sensitive resistor means on the shaft between the said one end thereof and the connection of the shaft with the motor arranged to develop an electric signal when the shaft is stressed torsionally that is proportional to the amount of the stress, means under the control of the signal for releasing an amount of power from said source to said motor proportional to the degree of said electric signal, and means responsive to the direction of the stress on the shaft for controlling the direction of rotation of the motor.

2. In combination; a shaft rotatably supported and having limited axial movement in opposite directions from a normal neutral position, means at one end of the shaft for exerting a torque thereon, means at the other end of the shaft for drivingly connecting it to a member to be driven and including spiral gear means, a reversible electric motor connected with the shaft, mechanical stress sensitive resistor means mounted on the shaft between the said one end thereof and its connection with said motor, a source of electric power, means controlled by the mechanical stressing of said resistor means for releasing an amount of power from said source to said electric motor corresponding to the degree of said stressing, and means responsive to axial movement of said shaft from its said neutral position for controlling the direction of rotation of said motor.

3. In combination; a drive shaft, means rotatably supporting said shaft and permitting axial movement thereof in opposite directions from a neutral position, means at one end of the shaft for exerting torque thereon, means at the other end of the shaft including spiral gear means for connecting the shaft with a member to be driven, a reversible electric motor connected with said shaft, mechanical stress sensitive resistor means mounted on the shaft between the said one end thereof and its connection with said motor, a source of electric power, relay means for connecting said source with said motor for driving the motor in one direction or the other, limit switches for controlling said relays arranged to be actuated in response to the said axial movement of said shaft, and means responsive to the stressing of said resistor means for controlling the amount of power released from said source to said motor so the power developed by said motor is proportional to the stress on said shaft.

4. In a power steering arrangement; a steering column having a manually operable steering wheel at its upper end, gear means on the lower end of said column for connection with the steerable mechanism to be actuated, a housing surrounding said gear means rotatably journaling said column and permitting axial movement thereof in opposite directions from a neutral position, a reversible electric motor connected with the column, a source of electric power, means responsive to axial movement of said column for connecting said source of power with said motor for rotation of the motor in one direction or the other, and means comprising mechanical stress sensitive resistor means mounted on said column between the said steering wheel and its connection with said motor for controlling the amount of power released to said motor.

5. In a power steering arrangement; a steering column having a manually operable steering wheel at its upper end, gear means on the lower end of said column for connection with the steerable mechanism to be actuated, a housing surrounding said gear means rotatably journaling said column and permitting axial movement thereof in opposite directions from a neutral position, a reversible electric motor connected with the column, a source of electric power, means responsive to axial movement of said column for connecting said source of power with said motor for rotation of the motor in one direction or the other, and means comprising mechanical stress sensitive resistor means mounted on said column between the said steering wheel and its connection with said motor for controlling the amount of power released to said motor, said motor comprising an armature mounted directly on said column and a stator surrounding said armature.

6. A power steering arrangement comprising a steering column having a rotatable upper portion for manual operation and a rotatable lower portion coupled to the upper portion and having axial movement relative thereto, an electric motor connected with the said lower portion of the steering column, an alternator, a full wave rectifier (56, 58) comprising grid-controlled gas discharge tubes connected to receive power from the alternator and to supply power to said motor, relay means energizable for connecting said rectifier with said motor for the driving thereof in one direction or the other, limit switch means for controlling said relays, a cam on the said lower portion of the steering column for actuating said limit switch means upon axial movement of the said lower portion of the steering column, mechanical stress sensitive resistor means mounted on the said lower portion of the steering column upwardly of the connection of the said motor therewith, and amplifier means connected to receive a signal from said resistor means and to deliver the said signal to the grids of said discharge tubes, whereby the amount of power released to said motor is proportional to the torque exerted on the steering column by the steering wheel.

7. A power steering arrangement comprising a steering column having a rotatable upper portion for manual operation and a rotatable lower portion coupled to the upper portion and having axial movement relative thereto, an electric motor connected with the said lower portion of the steering colunm, an alternator, a full wave rectifier comprising grid-controlled gas discharge tubes connected to receive power from the alternator and to supply power to said motor, relay means energizable for connecting said rectifier with said motor for the driving thereof in one direction or the other, limit switch means for controlling said relays, a cam on the said lower portion of the steering column for actuating said limit switch means upon axial movement of the said lower portion of the steering column, mechanical stress sensitive resistor means mounted on the said lower portion of the steering column upwardly of the connection of the said motor therewith, and amplifier means connected to receive a signal from said resistor means and to deliver the said signal to the grids of said discharge tubes, whereby the amount of power released to said motor is proportional to the torque exerted on the steering column by the steering wheel, there being spring means normally holding the said lower portion of said steering column in a neutral position whereby the cam carried thereby is spaced from said limit switch means.

8. In combination; a rotatable shaft, a reversible electric motor connected to drive the shaft, mechanical stress sensitive resistor means mounted on the shaft and connected in a bridge circuit for detecting torsional stresses on the shaft, battery powered vibrator means for supplying energy to the bridge, an alternator and a full wave rectifier connected thereto for supplying energy to the said motor, means responsive to the signal developed in the bridge by torque on the shaft for controlling the amount of power released from the rectifier to the motor, and said alternator being variable in speed whereby the greatest transfer of power to the motor takes place when there is the greatest difference between the alternator frequency and the vibrator frequency.

References Cited in the file of this patent

UNITED STATES PATENTS

| | | |
|---|---|---|
| 1,144,552 | Lardner et al. | June 29, 1915 |
| 1,948,487 | Berry | Feb. 27, 1934 |
| 2,109,418 | Fuller | Feb. 22, 1938 |
| 2,299,199 | Wood | Oct. 20, 1942 |
| 2,317,400 | Paulus et al. | Apr. 27, 1943 |
| 2,392,293 | Ruge | Jan. 1, 1946 |
| 2,411,139 | Roy et al. | Nov. 12, 1946 |
| 2,450,470 | Dion | Oct. 5, 1948 |
| 2,450,485 | Palmer | Oct. 5, 1948 |
| 2,531,228 | Macgeorge | Nov. 21, 1950 |
| 2,535,667 | Burger | Dec. 26, 1950 |
| 2,548,397 | Schaevitz | Apr. 10, 1951 |
| 2,551,742 | Huebner et al. | May 8, 1951 |
| 2,604,613 | Klass | July 22, 1952 |

FOREIGN PATENTS

| | | |
|---|---|---|
| 528,174 | Great Britain | Oct. 24, 1940 |